United States Patent [19]

Genin

[11] Patent Number: 4,856,796

[45] Date of Patent: Aug. 15, 1989

[54] CYLINDER-HEAD GASKET FOR INTERNAL-COMBUSTION ENGINE

[75] Inventor: Bernard C. Genin, Venissieux, France

[73] Assignee: Curty, Saint Priest, France

[21] Appl. No.: 252,858

[22] Filed: Sep. 30, 1988

[30] Foreign Application Priority Data

Oct. 2, 1987 [FR] France .................. 87 14141

[51] Int. Cl.$^4$ .............................................. F16J 15/12
[52] U.S. Cl. ................................ 277/235 B; 277/166; 277/234
[58] Field of Search .......... 277/166, 233, 234, 235 R, 277/235 A, 235 B, 236

[56] References Cited

U.S. PATENT DOCUMENTS

| | | | |
|---|---|---|---|
| 1,557,775 | 10/1925 | Robertson | 277/235 B |
| 2,001,225 | 5/1935 | Victor | 277/234 X |
| 3,477,867 | 11/1969 | Hillier | 277/235 B X |
| 4,312,512 | 1/1982 | Conte et al. | 277/166 X |

FOREIGN PATENT DOCUMENTS 3523151 1/1987 Fed. Rep. of Germany ... 277/235 B

Primary Examiner—Robert S. Ward
Attorney, Agent, or Firm—Herbert Dubno; Andrew M. Wilford

[57] ABSTRACT

A cylinder-head gasket comprises a metal core plate having two faces and formed with a plurality of cylinder holes, an annular groove of a predetermined depth around each cylinder hole on one of the plate faces, a plurality of stud holes, and a plurality of lubricant/coolant holes. This plate is normally made of stainless steel, a specialty steel, or a steel with a special surface treatment or coating. A resilient seal normally made of a fluorocarbon or silicone is provided on each of the core-plate faces around the lubricant/coolant holes. A cylinder plate of a thickness greater than the groove depth forms respective cylinder rings of the plate thickness sitting in the grooves around each of the cylinder holes. This cylinder plate is normally of a stainless or specialty steel also.

5 Claims, 1 Drawing Sheet

CYLINDER-HEAD GASKET FOR INTERNAL-COMBUSTION ENGINE

FIELD OF THE INVENTION

The present invention relates to cylinder-head gasket. More particularly this invention concerns such a gasket used on a high-compression internal combustion engine, normally a diesel.

BACKGROUND OF THE INVENTION

A standard cylinder-head gasket is compressed between the cylinder head and the block of an engine and is formed with through going holes for the cylinders, the head-mounting studs, and the coolant and lubricant circuits. This gasket is normally formed as a perforated plate of steel covered with a durable and heat-resistant material such as asbestos, although in some cases use is made of glass fibers, or a synthetic resin such as Kevlar. For a given engine there are normally three thicknesses available for installation normally when the engine is rebuilt.

In today's engines it is standard, particularly in diesels, to have a very high compression ratio, typically around 20:1 (ratio of maximum to minimum cylinder volume) as compared to the older low-compression engines where the ratio is 9:1 to 10:1. As a result of this high compression it is extremely important that the cylinder-head gasket be dimensioned to very close tolerances. This is particularly the case for a rebuilt engine.

Not only is asbestos a particularly difficult and dangerous material to work with, but the precise requirements of such a gasket, in several different thicknesses, make production complex and expensive.

OBJECTS OF THE INVENTION

It is therefore an object of the present invention to provide an improved cylinder-head gasket.

Another object is the provision of such an improved cylinder-head gasket which overcomes the above-given disadvantages, that is which can be produced at low cost to high tolerances.

SUMMARY OF THE INVENTION

A cylinder-head gasket according to the invention comprises a metal core plate having two faces and formed with a plurality of cylinder holes, an annular groove of a predetermined depth around each cylinder hole on one of the plate faces, a plurality of stud holes, and a plurality of lubricant/coolant holes. This plate is normally made of stainless steel, a specialty steel, or a steel with a special surface treatment or coating. A resilient seal normally made of a fluorocarbon or silicone is provided on each of the core-plate faces around the lubricant/coolant holes. A cylinder plate of a thickness greater than the groove depth forms respective cylinder rings of the plate thickness sitting in the grooves around each of the cylinder holes. This cylinder plate therefore stands up past the core plate and itself is normally of a stainless or specialty steel also.

Thus with this system the cylinder-ring plate and the core plate are separate elements, so that the same cylinder plate can be used with core plates of different thicknesses to make gaskets of different thicknesses. In fact according to the invention the seals are molded on the core plate and this same mold is used with core plates of different thicknesses to form gaskets of different thicknesses. It is therefore possible to produce the desired three different thicknesses of gaskets by using the same cylinder plates and seals, but with core plates, which typically are stamped at relatively low cost, of different thicknesses.

According to another feature of this invention solder spots or adhesive spots secure the cylinder and core plates together. It is also possible for the cylinder plate to be force-fitted into the grooves.

DESCRIPTION OF THE DRAWINGS

The above and other objects, features, and advantages will become more readily apparent from the following, reference being made to the accompanying drawing in which.

SPECIFIC DESCRIPTION

Figure 2:
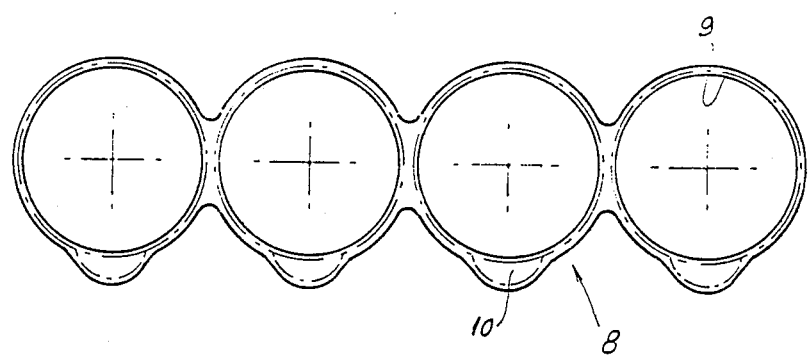
FIG. 2 is a top view of the plate forming the cylinder rings in accordance with the invention.
Figure 1:
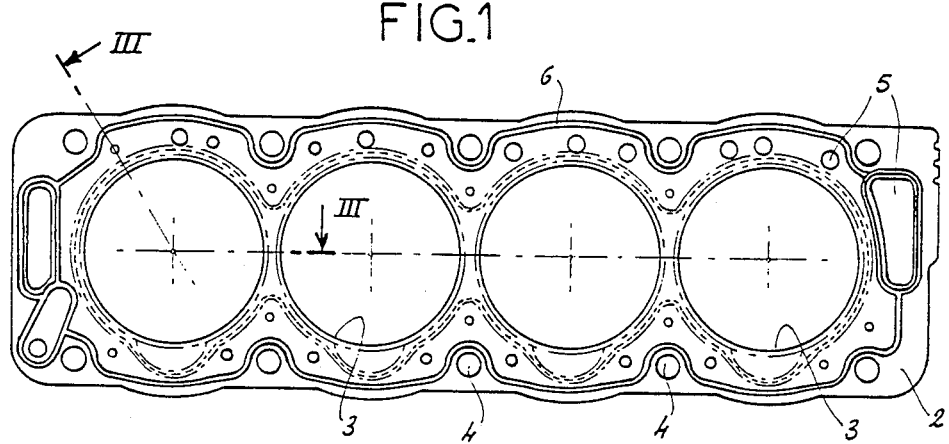
FIG. 1 is a small-scale top view of a cylinder-head gasket according to this invention.

As seen in the drawing a cylinder-head gasket according to the invention comprises a sheet-steel plate 2 formed with four relatively large in-line circular cylinder holes 3, small holes 4 for the head-mounting studs, and holes 5 for the passage of lubricating oil and coolant. A resilient seal 6 runs annularly around the outer periphery of the gasket on each face and prevents the liquid lubricants and coolants from leaking out.

Figure 3:
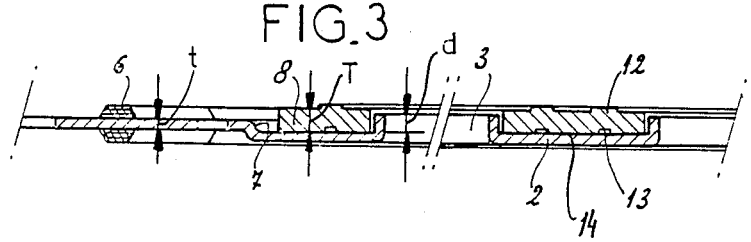
FIG. 3 is a large-scale section taken along line III—III of FIG. 1.

As best seen in FIG. 3 the plate is formed around the edge of each hole 3 with a recess 7 and these recesses 7 run together between the holes 3 so they can receive a plate 8 forming four cylinder-seal rings 9. This plate 8 is made of stainless or specialty steel and also is formed adjacent each cylinder hole 3 with a tab 10 for covering a precombustion chamber. FIG. 3 shows clearly that the plate 8 has a thickness T which is roughly twice the thickness t of the plate 2 and also substantially greater than the depth d of the grooves or recesses 7. In addition the plate 8 is formed with rigidifying ridges 12 and grooves 13 on its opposite faces, the latter lying against the plate 2.

In practice regardless of the desired thickness for the gasket, the same plate 8 is used and the different thicknesses T are obtained by using plates 2 of different thicknesses t. The seals 6 are molded directly onto the faces of the plate 9 by means of a mold which is used with plates 2 of different thicknesses to produce gaskets of different thicknesses. The plates 2 and 8 can be held together at 14 by small solder spots or welds, or even by adhesives. It is also possible to force fit the rings 9 into the grooves 7.

I claim:
1. A cylinder-head gasket comprising:
   a metal core plate having two faces and formed with
      a plurality of cylinder holes,
      an annular groove of a predetermined depth around each cylinder hole on one of the plate faces,
      a plurality of stud holes, and
      a plurality of lubricant/coolant holes;
   a resilient seal on each of the core-plate faces around the lubricant/coolant holes; and
   a cylinder plate of a thickness greater than the groove depth and forming respective cylinder rings of the plate thickness sitting in the grooves around each of the cylinder holes.

2. The cylinder-head gasket defined in claim 1 wherein the seals are molded on the core plate, whereby gaskets of different thicknesses can be formed by molding seals of the same size to core plates of different thicknesses.

3. The cylinder-head gasket defined in claim 1, further comprising solder spots securing the cylinder and core plates together.

4. The cylinder-head gasket defined in claim 1, further comprising adhesive securing the cylinder and core plates together.

5. The cylinder-head gasket defined in claim 1, wherein the cylinder plate is force-fitted into the grooves.

* * * * *